United States Patent
Ji et al.

(10) Patent No.: US 10,369,992 B2
(45) Date of Patent: Aug. 6, 2019

(54) VEHICLE AND VEHICLE CONTROL METHOD

(71) Applicants: HYUNDAI MOTOR COMPANY, Seoul (KR); KIA MOTORS CORPORATION, Seoul (KR)

(72) Inventors: Sungmin Ji, Yongin-si (KR); Jaewoong Choi, Seoul (KR); Yonjun Jang, Changwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 123 days.

(21) Appl. No.: 15/621,124

(22) Filed: Jun. 13, 2017

(65) Prior Publication Data

US 2018/0251129 A1 Sep. 6, 2018

(30) Foreign Application Priority Data

Mar. 3, 2017 (KR) .................. 10-2017-0027677

(51) Int. Cl.
  *G06F 17/10* (2006.01)
  *B60W 30/095* (2012.01)
  *B60W 30/18* (2012.01)

(52) U.S. Cl.
  CPC .. *B60W 30/0953* (2013.01); *B60W 30/18163* (2013.01); *B60W 2520/10* (2013.01); *B60W 2520/105* (2013.01)

(58) Field of Classification Search
  CPC ....... B60W 30/0953; B60W 30/18163; B60W 2520/105; B60W 30/09; G01S 13/931; G08G 1/16; B60T 7/22

USPC ................. 701/301, 22, 41, 70, 23, 93, 494; 180/65.28; 903/903; 345/672, 435
See application file for complete search history.

(56) References Cited

U.S. PATENT DOCUMENTS

| | | | | |
|---|---|---|---|---|
| 6,993,425 | B2* | 1/2006 | Tange | B60K 31/0008 340/435 |
| 7,778,759 | B2* | 8/2010 | Tange | B60T 8/17557 340/435 |
| 2002/0087253 | A1* | 7/2002 | Jeon | G06K 9/00798 701/93 |
| 2006/0020389 | A1* | 1/2006 | Yamamoto | G01C 21/26 701/494 |
| 2009/0088925 | A1* | 4/2009 | Sugawara | B60W 30/12 701/41 |

(Continued)

FOREIGN PATENT DOCUMENTS

| | | |
|---|---|---|
| JP | 2008-120288 A | 5/2008 |
| JP | 2010-030387 A | 2/2010 |

*Primary Examiner* — Shardul D Patel
(74) *Attorney, Agent, or Firm* — Morgan, Lewis & Bockius LLP

(57) ABSTRACT

A vehicle includes a speed detector for detecting a driving speed of the vehicle, a sensor for detecting a target vehicle driving in a target lane into which the vehicle is to change lanes, and a controller for determining an acceleration of the vehicle based on a change amount of the driving speed detected at the time of the vehicle changing lanes, for calculating a time to collision (TTC) between the vehicle and the target vehicle when the lane change of the vehicle would be completed to the target lane based on the determined acceleration of the vehicle, and for transmitting a signal restricting the lane change of the vehicle based on the calculated time to collision.

15 Claims, 9 Drawing Sheets

(56) References Cited

U.S. PATENT DOCUMENTS

| | | | |
|---|---|---|---|
| 2010/0063736 A1* | 3/2010 | Hoetzer | B60W 30/09 |
| | | | 701/301 |
| 2010/0274422 A1* | 10/2010 | Schrey | G01C 21/3461 |
| | | | 701/22 |
| 2011/0130936 A1* | 6/2011 | Noda | G08G 1/163 |
| | | | 701/70 |
| 2012/0120113 A1* | 5/2012 | Hueso | G06T 19/006 |
| | | | 345/672 |
| 2013/0013140 A1* | 1/2013 | Boehme | B60W 10/30 |
| | | | 701/22 |
| 2015/0120138 A1* | 4/2015 | Zeng | B62D 15/0265 |
| | | | 701/41 |
| 2015/0321699 A1* | 11/2015 | Rebhan | B60O 9/00 |
| | | | 701/23 |
| 2016/0039411 A1* | 2/2016 | Park | G01S 13/87 |
| | | | 701/70 |

* cited by examiner

VEHICLE AND VEHICLE CONTROL METHOD

CROSS-REFERENCE TO RELATED APPLICATION(S)

This application claims the benefit of priority to Korean Patent Application No. 10-2017-0027677, filed on Mar. 3, 2017 with the Korean Intellectual Property Office, the disclosure of which is incorporated herein by reference.

TECHNICAL FIELD

Implementations of the present disclosure relate to a vehicle and a vehicle control method, and more particularly, to a technology for determining a risk of collision with another vehicle driving in a target lane when a vehicle makes a lane change, and determining whether or not to transmit a signal for restricting the lane change behavior of the vehicle.

BACKGROUND

Vehicles are configured to transport an object, such as people and goods, to a destination. The vehicle may be capable of moving to a variety of locations by using wheels installed on a body of the vehicle. The vehicle may comprise a two, three or four-wheeled vehicle, such as a motorcycle, construction equipment, a bicycle, a car or a train.

In recent years, research in vehicles equipped with an Advanced Driver Assist System (ADAS) that actively provides information about the vehicle condition, the driver condition, and the surrounding environment has been performed in order to reduce the burden on the driver and improve user convenience.

In these aspects of the driver assistance system, an auxiliary system for preventing lane departure of the vehicle is being developed. Examples of the system for preventing lane departure include a Lane Keeping Assist System (LKAS) and a Lane Departure Warning System (LDWS). The lane-keeping assist system (LKAS) is a device that assists the driver in maintaining a position within a lane by performing haptic feedback using MDPS (Motor Driven Power Steering) when the driver, or the LKAS, detects an unintentional lane departure of the vehicle, and the lane departure warning system (LDWS) measures the lane using a front camera or the like, and alerts the driver to assist in safe driving when the LDWS detects a lane departure state, or behavior, of the vehicle.

The driver can control the driving speed of the vehicle. Therefore, in recent years, there has been a demand for development of a technique for controlling an auxiliary system that prevents lane departure when only a collision with another vehicle is possible or likely, taking into consideration the driving speed of the vehicle when changing a lane of travel.

SUMMARY

Therefore, it is an aspect of the present disclosure to provide a vehicle capable of transmitting a signal for restricting the change of lane only when a collision with another vehicle is estimated after changing lanes, in consideration of the driving speed of the vehicle trying to change a lane.

Additional aspects of the disclosure will be set forth in part in the description which follows and, in part, will be obvious from the description, or may be learned by practice of the disclosure.

In accordance with one aspect of the present disclosure, a vehicle includes: a speed detector configured to detect a driving speed of the vehicle; a sensor configured to detect a target vehicle driving in a target lane into which the vehicle is to change a lane; and a controller configured to determine an acceleration of the vehicle based on a change amount of the driving speed detected at the time of changing the lane of the vehicle, configured to calculate a time to collision (TTC) between the vehicle and the target vehicle when the lane change of the vehicle is completed on the target lane based on the determined acceleration of the vehicle, and configured to transmit a signal restricting the lane change of the vehicle based on the calculated time to collision.

The sensor may detect a first target vehicle driving on the target lane at a front side of the vehicle, and detects a second target vehicle driving on the target lane at a rear side of the vehicle.

The controller may transmit the signal for restricting the lane change of the vehicle when the calculated time to collision is equal to or less than a predetermined value, and does not transmit the signal for restricting the lane change of the vehicle when the calculated time to collision exceeds the predetermined value.

The controller may calculate the time to collision between the vehicle and the first target vehicle in the target lane when the vehicle makes a lane change toward the rear of the first target vehicle in the target lane.

The controller may transmit the signal for restricting the lane change of the vehicle when the calculated time to collision between the vehicle and the first target vehicle is equal to or less than a predetermined value, and does not transmit the signal for restricting the lane change of the vehicle when the calculated time to collision between the vehicle and the first target vehicle exceeds the predetermined value.

The controller may not transmit the signal for restricting the lane change of the vehicle when the driving speed of the vehicle is decreased and the acceleration of the vehicle is less than a predetermined value when the vehicle makes a lane change toward the rear of the first target vehicle in the target lane.

The controller may calculate the time to collision between the vehicle and the second target vehicle in the target lane when the vehicle makes a lane change toward the front of the second target vehicle in the target lane.

The controller may transmit the signal for restricting the lane change of the vehicle when the calculated time to collision between the vehicle and the second target vehicle is equal to or less than a predetermined value, and does not transmit the signal for restricting the lane change of the vehicle when the calculated time to collision between the vehicle and the first target vehicle exceeds the predetermined value.

The controller may not transmit the signal for restricting the lane change of the vehicle when the driving speed of the vehicle is increased and the acceleration of the vehicle exceeds the predetermined value when the vehicle makes a lane change toward the front of the second target vehicle in the target lane.

The controller may calculate a time it takes for the vehicle to change lanes to the target lane based on the detected driving speed of the vehicle and the lateral distance between the driving lane of the vehicle and the target lane.

The controller may calculate the relative distance between the vehicle and the target vehicle when the vehicle completes the lane change to the target lane based on the relative speed of the vehicle and the target vehicle and the determined acceleration of the vehicle.

The controller may calculate the time to collision between the vehicle and the target vehicle when the lane change of the vehicle is completed on the target lane based on the calculated time and the calculated relative distance.

The sensor may include any one of a radar and a Light Detection And Ranging (LiDAR).

In accordance with another aspect of the present disclosure, a method of controlling a vehicle includes: detecting a target vehicle driving in a target lane into which the vehicle is to change a lane; determining an acceleration of the vehicle based on a change amount of the driving speed detected at the time of changing the lane of the vehicle; calculating a time to collision (TTC) between the vehicle and the target vehicle when the lane change of the vehicle is completed to the target lane based on the determined acceleration of the vehicle; and transmitting a signal restricting the lane change of the vehicle based on the calculated time to collision.

The detection of the target vehicle may include detecting a first target vehicle driving on the target lane at a front side of the vehicle, and detecting a second target vehicle driving on the target lane at a rear side of the vehicle.

The transmitting the signal restricting the lane change of the vehicle may include transmitting the signal for restricting the lane change of the vehicle when the calculated time to collision is less than a predetermined value, and not transmitting the signal for restricting the lane change of the vehicle when the calculated time to collision exceeds the predetermined value.

The calculation of the time to collision between the vehicle and the target vehicle may include calculating the time to collision between the vehicle and the first target vehicle in the target lane when the vehicle makes a lane change toward the rear of the first target vehicle in the target lane.

The transmitting the signal restricting the lane change of the vehicle may include transmitting the signal for restricting the lane change of the vehicle when the calculated time to collision between the vehicle and the first target vehicle is equal to or less than a predetermined value, and not transmitting the signal for restricting the lane change of the vehicle when the calculated time to collision between the vehicle and the first target vehicle exceeds the predetermined value.

The method of controlling a vehicle may further include: not transmitting the signal for restricting the lane change of the vehicle when the driving speed of the vehicle is decreased and the acceleration of the vehicle is less than a predetermined value when the vehicle makes a lane change toward the rear of the first target vehicle in the target lane.

The calculation of the time to collision between the vehicle and the target vehicle may include calculatting the time to collision between the vehicle and the second target vehicle in the target lane when the vehicle makes a lane change toward the front of the second target vehicle in the target lane.

The transmitting the signal restricting the lane change of the vehicle may include transmitting the signal for restricting the lane change of the vehicle when the calculated time to collision between the vehicle and the second target vehicle is equal to or less than a predetermined value, and does not transmitting the signal for restricting the lane change of the vehicle when the calculated time to collision between the vehicle and the second target vehicle exceeds the predetermined value.

The method of controlling a vehicle may further include: not transmitting the signal for restricting the lane change of the vehicle when the driving speed of the vehicle is increased and the acceleration of the vehicle exceeds the predetermined value when the vehicle makes a lane change toward the front of the second target vehicle in the target lane.

The method of controlling a vehicle may further include: calculating a time it takes for the vehicle to change lanes to the target lane based on the detected driving speed of the vehicle and the lateral distance between the driving lane of the vehicle and the target lane.

The method of controlling a vehicle may further include: calculating the relative distance between the vehicle and the target vehicle when the vehicle completes the lane change to the target lane based on the relative speed of the vehicle and the target vehicle and the determined acceleration of the vehicle.

The method of controlling a vehicle may further include: calculating the time to collision between the vehicle and the target vehicle when the lane change of the vehicle is completed on the target lane based on the calculated time and the calculated relative distance.

BRIEF DESCRIPTION OF THE DRAWINGS

These and/or other aspects of the disclosure will become apparent and more readily appreciated from the following description of the implementations, taken in conjunction with the accompanying drawings of which.

DETAILED DESCRIPTION

Figure 1:
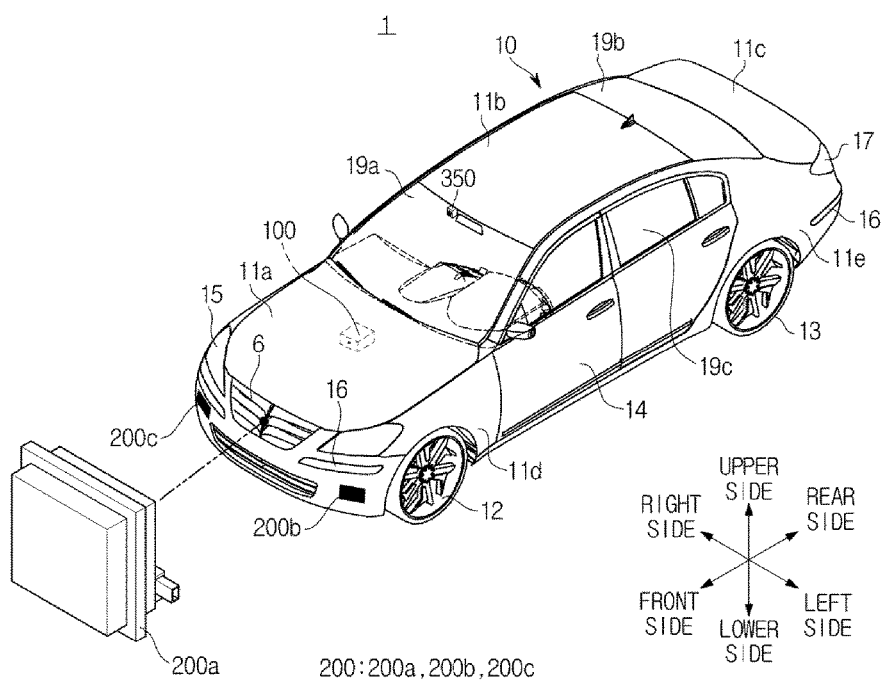
FIG. 1 is a perspective view schematically illustrating an appearance of a vehicle according to an exemplary implementation of the present disclosure.

In the following description, like reference numerals refer to like elements throughout the specification. Well-known functions or constructions are not described in detail since they would obscure the one or more exemplary implementations with unnecessary detail. Terms such as "unit", "module", "member", and "block" may be embodied as hardware or software. According to exemplary implementations, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each step may be implemented in an order different from the illustrated order unless the context clearly indicates otherwise.

Reference will now be made in detail to exemplary implementations of the present disclosure, examples of which are illustrated in the accompanying drawings.

Figure 2:
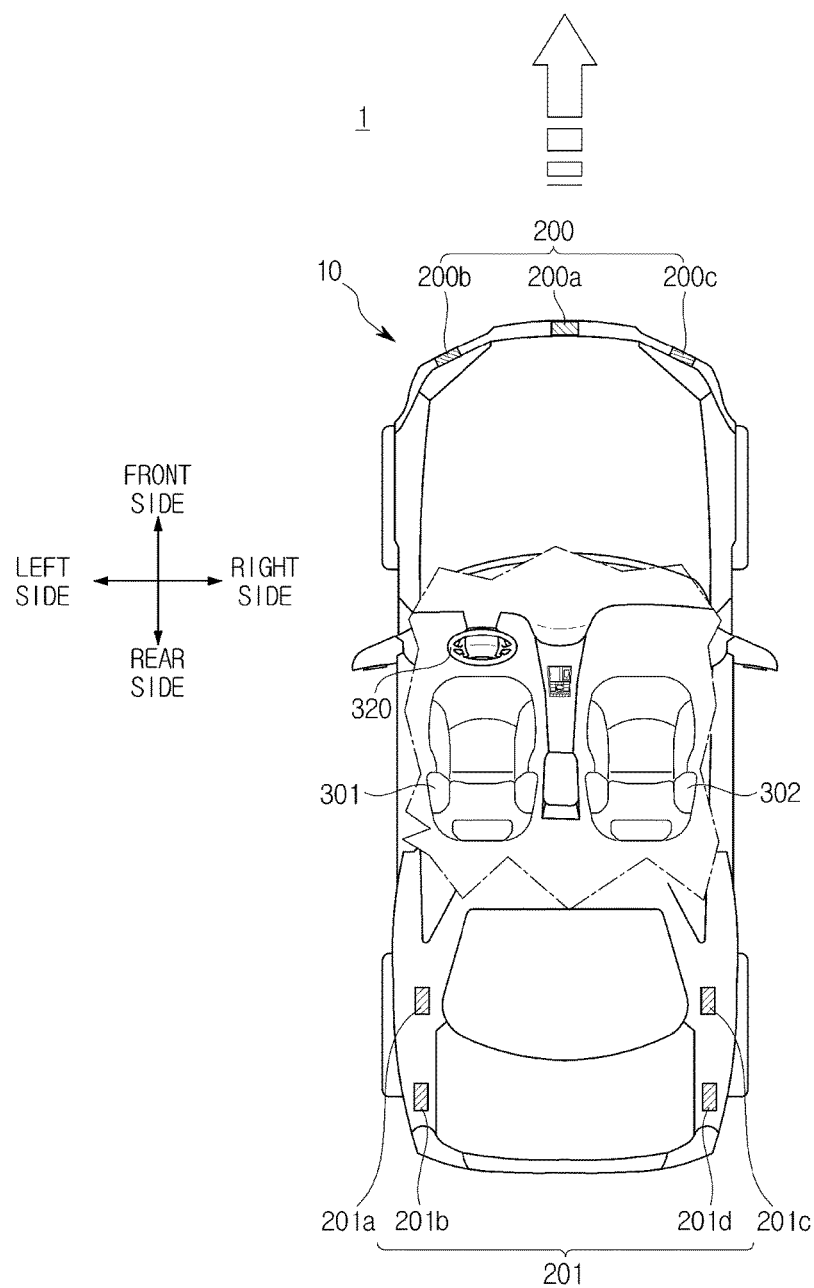
FIG. 2 is a view illustrating a vehicle of FIG. 1 provided with a sensor and a rear side sensor.
Figure 3:
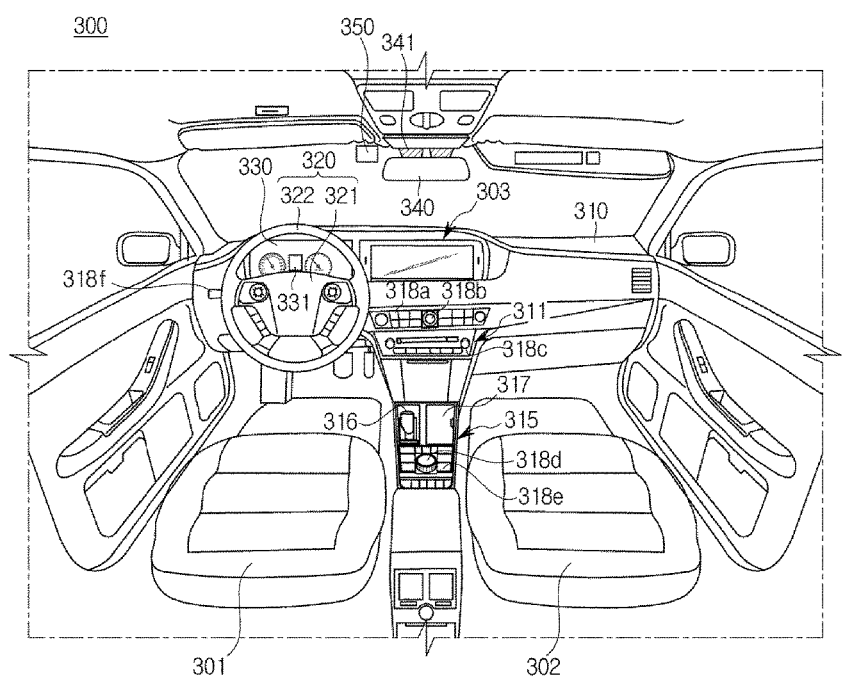
FIG. 3 is a view illustrating an interior structure of the vehicle of FIG. 1.
Figure 4:
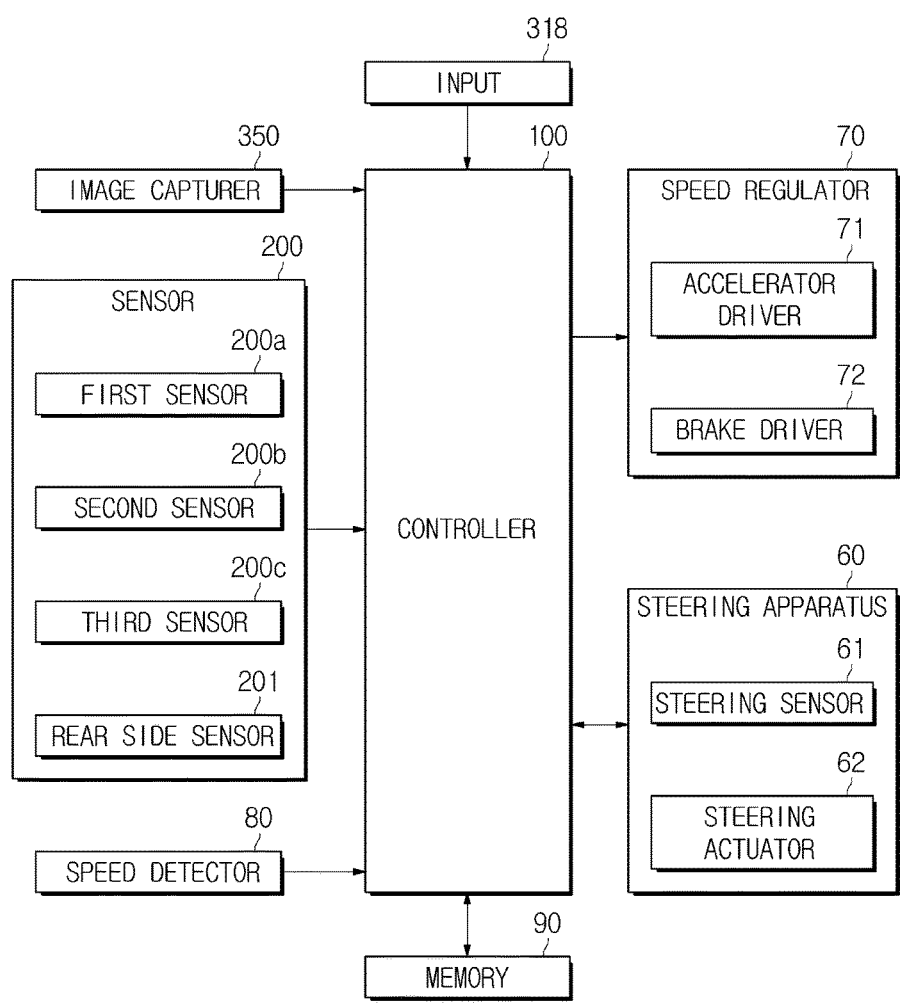
FIG. 4 is a schematic control flow diagram illustrating the vehicle of FIG. 1.

FIG. 1 is a perspective view schematically illustrating an appearance of a vehicle according to exemplary implementations of the present disclosure. FIG. 2 is a view illustrating the vehicle of FIG. 1 provided with a sensor and a rear side sensor, FIG. 3 is a view illustrating an interior structure of a vehicle according to exemplary implementations of the present disclosure, and FIG. 4 is a control flow diagram illustrating the vehicle according to exemplary implementations of the present disclosure.

Hereinafter for convenience of description, as illustrated in FIG. 1, a direction in which a vehicle moves forward may be defined as the front side, and the left direction and the right direction may be defined with respect to the front side. When the front side is a 12 o'clock direction, a 3 o'clock direction or its periphery may be defined as the right direction and a 9 o'clock direction or its periphery may be defined as the left direction. A direction opposite to the front side may be defined as the rear side. A bottom direction with respect to the vehicle 1 may be defined as the lower side and a direction opposite to the lower side may be defined as the upper side. A surface disposed in the front side may be defined as a front surface, a surface disposed in the rear side may be defined as a rear surface, and a surface disposed in the lateral side may be defined as a side surface. A side surface in the left direction may be defined as a left side surface and a side surface in the right direction may be defined as a right side surface.

Referring to FIG. 1, the vehicle 1 may include a body 10 forming an exterior of the vehicle 1, and a vehicle wheel 12 and 13 for moving the vehicle 1.

The body 10 may include a hood 11*a* for protecting a variety of devices, which are needed to drive the vehicle 1, e.g., an engine, a roof panel 11*b* forming an inner space, a trunk lid 11*c* provided with a storage space, a front fender 11*d* and a quarter panel 11*e* provided on the side surface of the vehicle 1. In addition, a plurality of doors 14 hinge-coupled to the body 10 may be provided on the side surface of the body 10.

Between the hood 11*a* and the roof panel 11*b*, a front window 19*a* may provide a view of the front side of the vehicle 1, and between the roof panel 11*b* and the trunk lid 11*c*, a rear window 19*b* may be provided to provide a view of the rear side of the vehicle 1. In addition, on the upper side of the door 14, a side window 19*c* may be provided to provide a view of the lateral side.

On the front side of the vehicle 1, a headlamp 15 for emitting a light in a driving direction of the vehicle 1 may be provided.

On the front and rear side of the vehicle 1, a turn signal lamp 16 for indicating a driving direction of the vehicle 1 may be provided.

The vehicle 1 may display a driving direction by flashing the turn signal lamp 16. On the rear side of the vehicle 1, a tail lamp 17 may be provided. The tail lamp 17 may be provided on the rear side of the vehicle 1 to display a gear shifting state and a brake operating state of the vehicle 1.

As illustrated in FIGS. 1 to 3, in the vehicle 1, at least one image capturer 350 may be provided. The image capturer 350 may capture images around the vehicle 1 during vehicle 1 driving or stopping, detect an object around the vehicle 1, and further acquire the type of the object and position information of the object. The object captured around the vehicle 1 may include another vehicle, a pedestrian and a bicycle, and may further include a moving object or a variety of stationary obstacles.

The image capturer 350 may capture an object around the vehicle 1 and detect the type of the object by identifying the shape of the captured object via image recognition, and transmit the detected information to a controller 100.

FIG. 3 illustrates that the image capturer 350 is provided adjacent to a room mirror 340, but is not limited thereto. Therefore, the image capturer 350 may be mounted to any position as long as capable of acquiring image information by capturing the inside or the outside of the vehicle 1.

The image capturer 350 may include at least one camera, and may particularly include a three dimension (3D) space recognition sensor, a radar sensor and an ultrasonic wave sensor for capturing a precise image.

The 3D space recognition sensor may employ a KINECT (RGB-D sensor), a structured light sensor (time of flight (TOF) sensor) or a stereo camera, but is not limited thereto. Therefore, any other device having a similar function as the above mentioned function may be included.

Referring to FIGS. 1 and 2, in the vehicle 1, a sensor 200 configured to detect an object in front of the vehicle and acquire at least one of position information and driving speed information of the detected object may be provided.

The sensor 200 according to the implementation may acquire coordinate information of an object around the vehicle 1 with respect to the vehicle 1. That is, the sensor 200 may acquire coordinate information, which is changed according to the movement of the object, in real time, and may detect a distance between the vehicle 1 and the object.

As mentioned below, the controller 100 may calculate a relative distance between the vehicle 1 and the object and a relative speed between the vehicle 1 and the object by using position information and speed information of the object acquired by the sensor 200, and calculate a time to collision (TTC) between the vehicle 1 and the object.

As illustrated in FIGS. 1 and 2, the sensor 200 may be installed in a position that is appropriate to recognize an object, e.g. another vehicle, in the front, lateral or front lateral side. According to the implementation, the sensor 200 may be installed in all of the front, the left and the right side of the vehicle 1 to recognize an object in all of the front side of the vehicle 1, a direction between the left side and the front side (hereinafter referred to as "left front side") of the vehicle 1 and a direction between the right side and the front side (hereinafter referred to as "right front side") of the vehicle 1.

For example, a first sensor 200*a* may be installed as a part of a radiator grill 6, e.g., inside of the radiator grill 6, or alternatively the first sensor 200*a* may be installed in any position of the vehicle 1 as long as it is capable of detecting another vehicle in the front side. A second sensor 200*b* may be installed in the left side surface of the vehicle 1 and a third sensor 200c may be installed in the right side surface of the vehicle 1.

The sensor 200 may determine whether another vehicle is present or is approaching in the left side, the right side, the front side, the rear side, the left front side, the right front side, the left rear side, or the right rear side, by using electromagnetic waves or laser light.

That is, the sensor 200 can detect another vehicle that is driving in the right lane of the lane in which the vehicle 1 is driving. For example, in a case where another vehicle is driving in the right lane of the lane in which the vehicle 1 is driving and another vehicle is located on the right front side of the vehicle 1, the third sensor 200c can detect another vehicle that is driving on the right front side of the vehicle 1. The third sensor 200c can detect another vehicle that is driving on the right front side of the vehicle 1 and obtain coordinate information and driving speed information of another vehicle.

Similarly, the sensor 200 can detect another vehicle that is driving in the left lane of the lane in which the vehicle 1 is driving. For example, in a case where another vehicle is driving in the left lane of the lane in which the vehicle 1 is driving and another vehicle is located on the left front side of the vehicle 1, the second sensor 200b can detect another vehicle that is driving on the left front side of the vehicle 1. The second sensor 200b can detect another vehicle that is driving on the left front side of the vehicle 1 and obtain coordinate information and driving speed information of another vehicle.

The sensor 200 may include a rear side sensor 201 that detects a pedestrian or other vehicle that exists in or approaches the rear, the side, or between the side and the rear (hereinafter the rear side) directions of the vehicle 1.

The rear side sensor 201 can be installed at a proper position at which the vehicle can recognize the side, rear, or rear side object, for example, another vehicle, as shown in FIG. 2

According to some implementations, the rear side sensor 201 may be provided on both the left side and the right side of the vehicle 1 so as to recognize the object from both the direction between a left side and a rear (hereinafter, left rear side) of the vehicle 1, and the direction between a right side and a rear (hereinafter, right rear side) of the vehicle 1. For example, a first rear side sensor 201a or a second rear side sensor 201b may be provided on the left side of the vehicle 1, and a third rear side sensor 201c or a fourth rear side sensor 201d may be provided on the right side of the vehicle 1.

Further, according to some implementations, the rear side sensor 201 may be installed at various positions so as to properly recognize the vehicle. For example, the first rear side sensor 201a and the second rear side sensor 201b are installed on the left side c—pillar of the vehicle 1 and the left rear fender of the vehicle 1, respectively, and it is possible to individually recognize the presence or access of pedestrians or other vehicles. Likewise, the third rear side sensor 201c or the fourth rear side sensor 201d are provided on the right side c—pillar of the vehicle 1 and the right rear fender of the vehicle 1, respectively, and it is possible to individually recognize the presence of other vehicles. The installation position of the rear side sensor 201 is not limited to this, and the rear side sensor 201 may be installed around various positions of the vehicle 1, for example, the rear lamp of the vehicle 1, which the designer may consider.

The rear side sensor 201 can detect another vehicle that is driving in the rear of the right lane of the lane in which the vehicle 1 is driving. For example, in a case where another vehicle is driving in the right lane of the lane in which the vehicle 1 is driving and another vehicle is located on the right rear side of the vehicle 1, the third rear side sensor 201c or the fourth rear side sensor 201d can detect another vehicle that is driving on the right rear side of the vehicle 1. The third rear side sensor 201c or the fourth rear side sensor 201d can detect another vehicle that is driving on the right rear side of the vehicle 1 and obtain coordinate information and driving speed information of another vehicle.

Similarly, the rear side sensor 201 can detect another vehicle that is driving in the rear of the left lane of the lane in which the vehicle 1 is driving. For example, in a case where another vehicle is driving in the left lane of the lane in which the vehicle 1 is driving and another vehicle is located on the left rear side of the vehicle 1, the first rear side sensor 201a or the second rear side sensor 201b can detect another vehicle that is driving on the left rear side of the vehicle 1. The first rear side sensor 201a or the second rear side sensor 201b can detect another vehicle that is driving on the left rear side of the vehicle 1 and obtain coordinate information and driving speed information of another vehicle.

The sensor 200 may determine whether another vehicle is present or is approaching in the left side, the right side, the front side, the rear side, the left front side, the right front side, the left rear side, or the right rear side, by using electromagnetic waves or laser light. For example, the sensor 200 may emit electromagnetic waves, e.g., microwaves or millimeter waves, pulsed laser light, ultrasonic waves, or infrared light, in the left side, the right side, the front side, the rear side, the left front side, the right front side, the left rear side, or the right rear side, receive pulsed laser light, ultrasonic waves, or infrared light, which are reflected or scatted by an object in the direction, and determine where the object is located. In this case, the sensor 200 may further determine a speed of the object or the speed of another vehicle driving, by using a return time of the radiated electromagnetic waves, pulsed laser light, ultrasonic waves or infrared light.

In addition, according to some implementations, the sensor 200 receives visible light reflected or scattered by an object on the left side, the right side, the front, the rear, the left front side, the right front side, the left rear side, or the right rear side and the sensor 200 may determine whether or not an object exists at such a location relative to the vehicle 1. As described above, depending on which one of the electromagnetic wave, the pulse laser light, the ultrasonic wave, the infrared ray, and the visible light is used, the recognition distance for the other vehicle located ahead or rearward can be changed, and the weather or illumination may affect determining the presence of the object.

By using such a process, when the vehicle 1 drives in a predetermined direction along a predetermined lane, the controller 100 of the vehicle 1 may determine whether or not there is another vehicle driving on the other lane existing in the left side, the right side, the front, the rear, the left front side, the right front side, the left rear side or the right rear side of the vehicle 1.

For example, the sensor 200 may emit electromagnetic waves, e.g., microwaves or millimeter waves, pulsed laser light, ultrasonic waves, or infrared light, in the left side, the right side, the front side, the rear side, the left front side, the right front side, the left rear side, or the right rear side, receive pulsed laser light, ultrasonic waves, or infrared light, which are reflected or scatted by an object in the direction, and determine where the object is placed relative to the vehicle 1. In this case, the sensor 200 may further determine a distance between the vehicle 1 and another object or a speed of another moving object, by using a return time of the radiated electromagnetic waves, pulsed laser light, ultrasonic waves or infrared light.

According to some implementations, the sensor 200 may determine the presence of the object by receiving visible light that is reflected or scattered by the object in the left side, the right side, the front, the rear, the left front side, the right front side, the left rear side or the right rear side. As mentioned above, a recognition distance to another object placed in the front or rear side may vary according to which one of the electromagnetic waves, the pulsed laser light, the ultrasonic waves, the infrared light or the visible light is used, and the weather or illumination may affect determining the presence of the object.

By using such a process, when the vehicle 1 drives in a certain direction along a certain lane, the controller 100 of the vehicle 1 may determine whether another object, which is moving while being present in the left side, the right side, the front, the rear, the left front side, the right front side, the left rear side or the right rear side of the vehicle 1, is present or not, and acquire position information and speed information of the object.

The sensor 200 may be implemented by using a variety of devices, e.g., a radar using millimeter waves or microwaves, a Light Detection And Ranging (LiDAR) using pulsed laser light, a vision sensor using visible light, an infrared sensor using infrared light, or an ultrasonic sensor using ultrasonic waves. The sensor 200 may be implemented by using any one of the radar, the Light Detection And Ranging (LiDAR), the vision sensor, the infrared sensor, or the ultrasonic sensor or by combining one or more of the sensors. When a plurality of sensors 200 is provided in a single vehicle 1, each of the sensors 200 may be implemented by using the same type of sensor or a different type of sensor. The implementation of the sensor 200 is not limited thereto, and the sensor 200 may be implemented by using a variety of devices and a combination thereof which is considered by a designer.

Referring to FIG. 3, in an interior 300 of the vehicle, a driver seat 301, a passenger seat 302, a dashboard 310 and a steering wheel 320, and an instrument panel 330 may be provided.

The dashboard 310 may represent a panel configured to divide the inside of vehicle 1 into the interior of the vehicle 1 and an engine compartment, and in which a variety of components required for the driving are installed. The dashboard 310 may be provided in the front side of the driver seat 301 and the passenger seat 302. The dashboard 310 may include an upper panel, a center fascia 311 and a gear box 315.

In the upper panel of the dashboard 310, a display 303 may be installed. The display 303 may provide a variety of information to a driver or a passenger of the vehicle 1, as an image. For example, the display 303 may visually provide a variety of information, e.g., a map, weather, news, a variety of moving images or still images, and a variety of information related to conditions or operation of the vehicle 1, e.g., information about an air conditioning device. Further, the display 303 may provide a warning according to the risk, to the driver or the passenger. Particularly, when the vehicle 1 changes its lane, the display 303 may provide a warning to the driver, which varies according to the risk. The display 303 may be implemented by using a navigation system that is commonly used in the vehicle 1.

The display 303 may be installed in a housing that is integrally formed with the dashboard 310 to allow a display panel to be exposed to the outside. The display 303 may be installed in the center portion or a lower end of the center fascia 311, an inner surface of a windshield (not shown), or an upper surface of the dashboard 310, wherein the display 303 may be installed in the upper surface of the dashboard 310 by using a supporter (not shown). Alternatively, the display 303 may be installed in a variety of positions considered by the designer.

In the dashboard 310, a variety of devices, e.g., a processor, a communication device, a GPS reception device, and a storage, may be installed. The processor installed in the vehicle 1 may be configured to control electronics installed in the vehicle 1, and as mentioned above, the processor may be provided to perform functions of the controller 100. The above-mentioned devices may be implemented by using a variety of components, e.g., semiconductor chips, switches, integrated circuits, resistors, volatile or non-volatile memory or printed circuit boards.

The center fascia 311 may be provided in the center of the dashboard 310 and may be provided with an input 318a to 318c for inputting a variety of commands related to the vehicle. The input 318a to 318c may be implemented using a physical button, a knob, a touch pad, a touch screen, a stick-type operator or a track ball. The driver may control the various operations of the vehicle 1 by operating the input 318a to 318c.

The gear box 315 may be provided between the driver seat 301 and the passenger seat 302 in the lower end of the center fascia 311. In the gearbox 315, a gear 316, a console 317, and various inputs 318d, 318e may be provided. The input 318d to 318e may be implemented using a physical button, a knob, a touch pad, a touch screen, a stick-type operator or a track ball. The console 317 and the input 318d to 318e may be omitted according to some implementations.

The steering wheel 320 and the instrument panel 330 may be provided in the direction of the driver seat in the dashboard 310.

The steering wheel 320 may be rotatable in a certain direction according to an operation of the driver, and the front vehicle wheel or the rear vehicle wheel of the vehicle 1 may be rotated according to the rotation direction of the steering wheel 320 so that the vehicle 1 is steered. In the steering wheel 320, a spoke 321 connected to a rotational shift and a handle wheel 322 coupled to the spoke 321 may be provided. In the spoke 321, an input means may be installed for inputting a variety of commands, and the input means may be implemented using a physical button, a knob, a touch pad, a touch screen, a stick-type operator, or a track ball. The handle wheel 322 may have a circular shape for the convenience of the driver, but is not limited thereto. A vibrator may be provided inside at least one of the spoke 321 and the handle wheel 322 and then the at least one of the spoke 321 and the handle wheel 322 may be vibrated with a certain intensity according to an external control. According to some implementations, the vibrator may be vibrated with various intensities in response to an external control signal, and thus the at least one of the spoke 321 and the handle wheel 322 may be vibrated with various intensities in response to the external control signal. The vehicle 1 may provide a haptic warning to the driver by using the vibrator. For example, the at least one of the spoke 321 and the handle wheel 322 may be vibrated with an intensity corresponding to a risk, which is determined when the vehicle 1 changes its lane, so as to provide a variety of warnings to the driver. Particularly, as the risk is higher, the at least one of the spoke 321 and the handle wheel 322 may be relatively strongly vibrated so as to provide a high level warning to the driver.

In the rear side of the steering wheel 320, a turn signal indicator input 318f may be provided. A user may input a signal to change a driving direction or a lane via the turn signal indicator input 318f during driving the vehicle 1.

The instrument panel 330 may be configured to provide a variety of information related to the vehicle to the driver, wherein the variety of information may include a speed of the vehicle 1, an engine speed, fuel residual amount, a temperature of engine oil or whether the turn signal indicator is flashed or not. The instrument panel 330 may be implemented using an illumination lamp or a scale plate or may be implemented using a display panel according to implementations. When the instrument panel 330 is implemented using the display panel, the instrument panel 330 may display more various information, e.g., fuel consumption, whether various devices mounted on the vehicle 1 are performed or not, as well as the above mentioned information, for the driver. According to the implementation, the instrument panel 330 may output various warnings to the driver according to the risk of the vehicle 1. Particularly, the instrument panel 330 may provide various warnings to the driver according to the determined risk when the vehicle 1 changes a lane.

Referring to FIG. 4, according to some implementations, the vehicle 1 may include a steering apparatus 60 configured to control steer the vehicle 1, a speed regulator 70 configured to regulate a driving speed of the vehicle 1 driven by the driver, a speed detector 80 configured to detect a driving speed of the vehicle 1, the memory 90 configured to store data related to the control of the vehicle 1, and the controller 100 configured to control each component of the vehicle 1 and the driving speed of the vehicle 1.

The steering apparatus 60 may include a steering sensor 61 for sensing a steering operation of the driver and a steering actuator 62 for generating an auxiliary steering torque to assist the steering of the vehicle 1.

The steering sensor 61 is provided on a rotating shaft connected to the steering wheel 322 or on the steering wheel 322 and senses a steering input according to an operation of the driver's steering wheel 322, and outputs a steering angle and a steering torque and transmits the detected torque to the controller 100. The steering sensor 61 may include a steering angle sensor for detecting the steering angle and a steering torque sensor for detecting the steering torque.

The steering actuator 62 serves to generate an auxiliary steering torque for assisting the driving stability of the vehicle 1 and includes an electric power steering (EPS) and a motor driven power steering (MDPS).

The speed regulator 70 may regulate a speed of the vehicle 1 driven by a driver. The speed regulator 70 may include an accelerator driver 71 and a brake driver 72.

The accelerator driver 71 may increase a speed of the vehicle 1 by driving the accelerator in response to a control signal of the controller 100, and the brake driver 72 may reduce a speed of the vehicle 1 by driving the brake in response to a control signal of the controller 100.

The controller 100 may increase or reduce the driving speed of the vehicle 1 so that a distance between the vehicle 1 and another object is increased or reduced based on a distance between the vehicle 1 and another object and a predetermined reference distance stored in the memory 90.

In addition, the controller 100 may calculate the time to a possible collision between the vehicle 1 and the object based on the relative distance and the relative speed between the vehicle 1 and the object, and transmit a signal, which is configured to control a driving speed of the vehicle 1 based on the calculated time to the possible collision, to the speed regulator 70.

The speed regulator 70 may regulate the driving speed of the vehicle 1 under the control of the controller 100, and may reduce the driving speed of the vehicle 1 when the risk of collision between the vehicle 1 and another object is high.

The speed detector 80 may detect a driving speed of the vehicle 1 driven by the driver under the control of the controller 100. That is, the speed detector 80 may detect the driving speed of the vehicle 1 by using the rotation speed of the vehicle wheel, and the unit of the driving speed may be expressed as [kph], and a moving distance per unit time (h) may be expressed as (km).

The memory 90 may store a variety of data related to the control of the vehicle 1. Particularly, the memory 90 may store information related to the driving speed, the driving distance and the driving time and driving information about the vehicle 1 according to some implementations, and store the type and position information of an object detected by the image capturer 350.

The memory 90 may store position information and speed information of the object detected by the sensor 200, coordinate information of a moving object that is changed in real time, and information about the relative distance and the relative speed between the vehicle 1 and the object.

In addition, the memory 90 may store data related to an equation and a control algorithm to control the vehicle 1 according to some implementations, and the controller 100 may transmit a control signal controlling the vehicle 1 according to the equation and the control algorithm.

The memory 90 may be implemented by using at least one of a non-volatile memory element, e.g., a cache, a Read Only Memory ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a memory medium, e.g., a Hard Disk Drive (HDD) and a CD-ROM. The implementation of the memory 90 is not limited thereto. The memory 90 may be a memory that is implemented by a separate memory chip from the aforementioned processor related to the controller 100 or the memory 90 may be implemented by a processor and a single chip.

Referring again to FIGS. 1 and 4, at least one controller 100 may be provided inside the vehicle 1. The controller 100 may perform electronic control for each configuration related to the operation of the vehicle 1.

Figure 5:
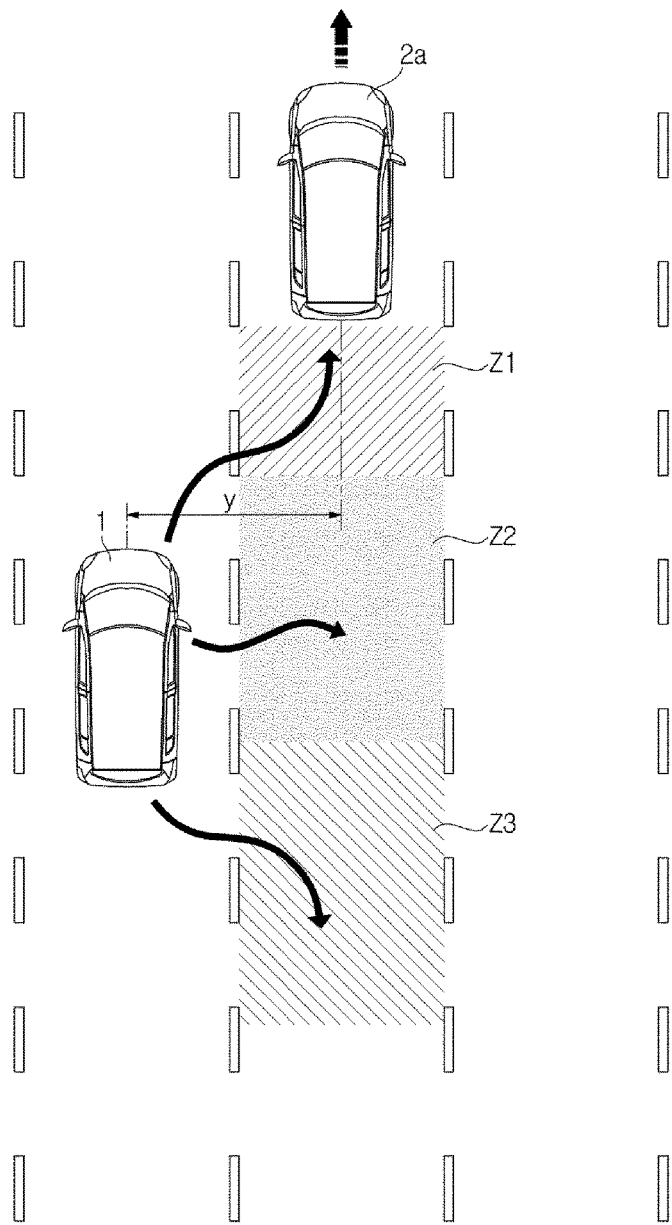
FIGS. 5 to 7 are conceptual diagrams showing a determination of whether or not to transmit a signal restricting a lane change of a vehicle when the vehicle makes a lane change, according to exemplary implementations of the present disclosure.
Figure 6:
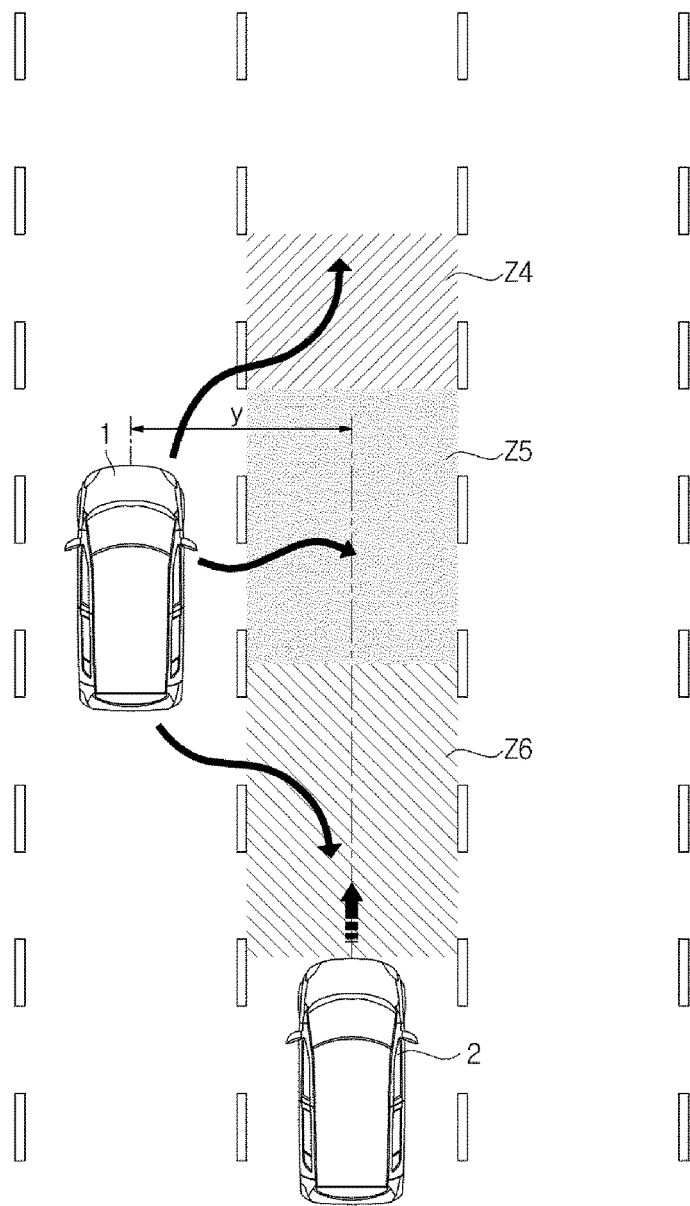
Figure 7:
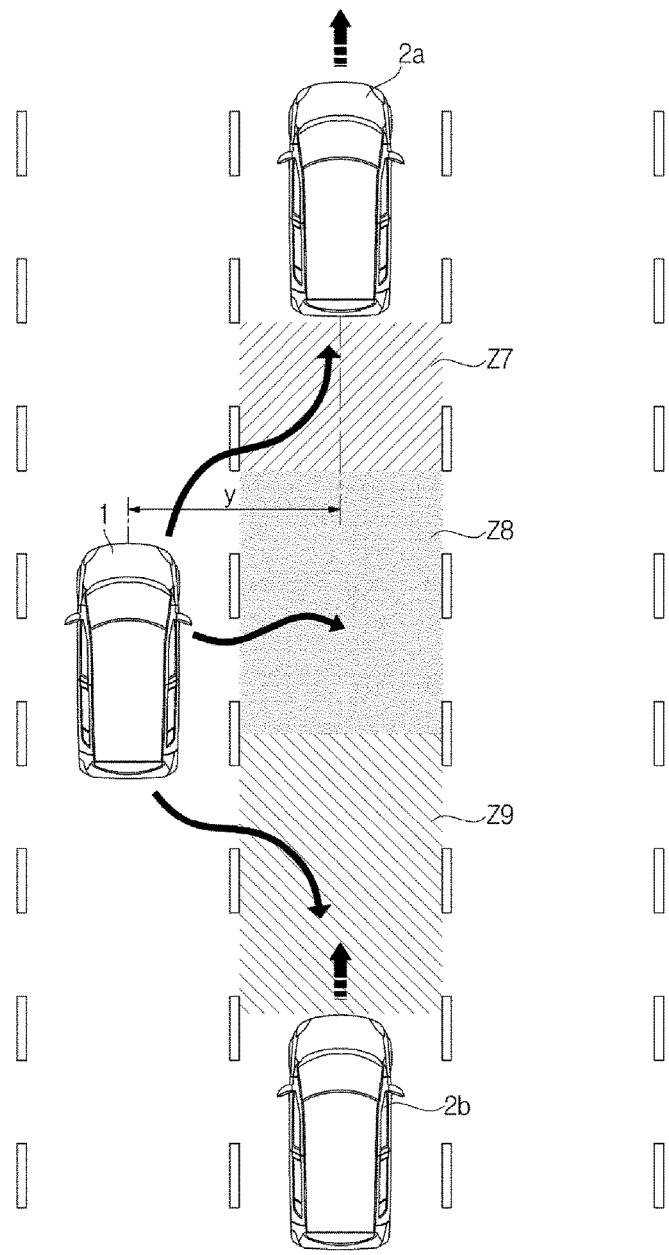

FIGS. 5 to 7 are conceptual diagrams showing a determination of whether or not to transmit a signal restricting a lane change operation of the vehicle 1 when the vehicle 1 makes, or attempts to make, a lane change, according to exemplary implementations of the present disclosure.

Referring to FIG. 5, when changing the lane to the right lane of the lane in which the vehicle 1 is driving, the driver can change the lane while maintaining the current driving speed of the vehicle 1 and increase or decrease the driving speed.

That is, although the driving speed of the vehicle 1 may be changed when the lane of the vehicle 1 is changed by the intention of the driver, in the existing lane departure prevention system, lane departure avoidance control is performed in consideration of only the current driving speed of the vehicle 1 without reflecting the change in the driving speed of the vehicle 1 due to the intention of the driver.

Therefore, even though the driver can prevent a collision with another vehicle by increasing or decreasing the driving speed of the vehicle 1 in consideration of another vehicle that is driving in the target lane when the vehicle 1 changes the lane to the target lane, there is a problem that the lane departure prevention system is unnecessarily operated and thus it is against the intention of the driver.

In the case of the vehicle 1 and the control method thereof according to exemplary disclosed implementations, the estimated collision time between the vehicle 1 and another vehicle is calculated on the basis of the acceleration of the vehicle 1 according to the amount of change of the driving speed of the vehicle 1 when the lane of the vehicle 1 is changed, and it is possible to decide whether or not to transmit a signal restricting the change.

Referring to FIG. 5, the sensor 200 may sense the target vehicle 2 driving in the right lane of the lane in which the vehicle 1 is driving during the driving of the vehicle 1. Similarly, the sensor 200 may sense the target vehicle 2 driving in the left lane of the lane in which the vehicle 1 is driving.

Specifically, when there is a first target vehicle 2a driving on the target lane on the right front side of the vehicle 1, the third sensor 200c of the vehicle 1 may sense the first target vehicle 2a and obtain the coordinate information and the driving speed information of the first target vehicle 2a.

When the driver of the vehicle 1 operates the steering wheel 322 to change the lane of the vehicle 1 being driven, the steering sensor 61 may sense the steering input according to the operation of the driver's steering wheel 322, detect the steering angle and the steering torque, and transmit the steering angle and the steering torque to the controller 100. The controller 100 may determine that steering is performed to change the lane in which the vehicle 1 is driving based on the signal received from the steering sensor 61.

As shown in FIG. 5, when the vehicle 1 makes a lane change to the rear of the first target vehicle 2a driving in the target lane for changing the lane, the time to collision between the vehicle 1 and the first target vehicle 2a may be changed according to the relative speed based on the driving speed of the vehicle 1 making the lane change and the driving speed of the first target vehicle 2a or the relative distance between the vehicle 1 and the first target vehicle 2a.

When the vehicle 1 makes a lane change to the rear of the first target vehicle 2a, the position of the vehicle 1 in the target lane may be changed as the driving speed increases or decreases.

That is, when the vehicle 1 makes a lane change while increasing the driving speed, the lane change may be completed in a first zone Z1 close to the rear of the first target vehicle 2a. When the lane change is performed while the vehicle 1 maintains the current driving speed, the lane change may be completed in a second zone Z2 located further behind the first zone Z1 with respect to the first target vehicle 2a. When the vehicle 1 changes the lane while reducing the driving speed of the vehicle 1, the lane change may be completed in a third zone Z3 located further behind the second zone Z2 with respect to the first target vehicle 2a.

The positions of the first zone Z1 to the third zone Z3 of the target lane for lane change of the vehicle 1 are determined based on the driving speed at the time of lane change of the vehicle 1 and the distance between the vehicle 1 and the first target vehicle 2a.

When the vehicle 1 makes a lane change, the risk of collision between the vehicle 1 and the first target vehicle 2a may vary according to the where target lane is changed in the first zone Z1, the second zone Z2, and the third zone Z3 behind the first target vehicle 2a.

When the vehicle 1 increases the driving speed of the vehicle 1 while changing the lane, the acceleration of the vehicle 1 at the lane change has a positive value. In this case, since the vehicle 1 makes a lane change to a position close to the rear of the first target vehicle 2a, the risk of collision between the vehicle 1 and the first target vehicle 2a after the lane change is increased.

On the other hand, when the vehicle 1 decreases the driving speed of the vehicle 1 while changing the lane, the acceleration of the vehicle 1 at the lane changing has a negative value. In this case, the risk of collision between the vehicle 1 and the first target vehicle 2a after the lane change is reduced because the vehicle 1 makes a lane change to a position relatively far from the rear of the first target vehicle 2a.

The controller 100 may determine the acceleration of the vehicle 1 based on the amount of change in the driving speed sensed at the time of lane change of the vehicle 1, and the controller 100 may calculate the time to collision between the vehicle 1 and the first target vehicle 2a when the lane change of the vehicle 1 is completed to the target lane based on the determined acceleration of the vehicle 1.

Specifically, the controller 100 may calculate the time (t) it takes for the vehicle 1 to change the lane to the target lane according to Equation (1) based on the current driving speed of the vehicle 1 and the lateral distance between the driving lane in which the vehicle 1 is currently driving and the target lane into which the lane is to be changed.

$$y = V_{XE} \cdot \varphi \cdot t + \tfrac{1}{2} \cdot V_{XE} \cdot \gamma \cdot t^2 \qquad \text{[Equation 1]}$$

Here, y is the lateral distance between the center of the lane in which the vehicle 1 is currently driving and the center of the target lane into which the lane is to be changed, $V_{XE}$ is the current driving speed of the vehicle 1, and $\varphi$ is the heading angle. The heading angle means an angle (rad) in the driving direction of the vehicle 1 with respect to the longitudinal direction of the lane. That is, the heading angle means the changed angle of the vehicle 1 when changing the lane on the basis of the longitudinal direction in which the vehicle 1 is currently driving. Also, $\gamma$ means the yaw rate and the unit is [rad/s].

The controller 100 may determine the acceleration of the vehicle 1 based on the amount of change in the driving speed sensed when the lane of the vehicle 1 changes. The controller 100 may calculate the relative distance $X_{rel}$ between the vehicle 1 and the first target vehicle 2a in accordance with Equation 2 based on the determined acceleration $a_E$ of the vehicle 1 and longitudinal relative speed $V_{Xrel}$ between the vehicle 1 and the first target vehicle 2a when the lane change is completed.

$$X_{rel} = X_0 + V_{Xrel} \cdot t + \tfrac{1}{2} \cdot a_E \cdot t^2 \qquad \text{[Equation 2]}$$

That is, as the driving speed of the vehicle 1 increases or decreases when the vehicle 1 changes lanes, the acceleration of the vehicle 1 at the time of lane changing is determined, and the relative distance $X_{rel}$ between the vehicle 1 and the first target vehicle 2a may be estimated when the lane change of the vehicle 1 is completed.

The controller 100 may calculate the time to collision between the vehicle 1 and the first target vehicle 2a according to Equation 3 when the lane change of the vehicle 1 is completed to the target lane based on the acceleration $a_E$ of the vehicle 1 determined when the vehicle 1 changes the lane, the relative distance $X_{rel}$ between the vehicle 1 and the first target vehicle 2a when the lane change is completed, the longitudinal relative speed $V_{Xrel}$ between the vehicle 1 and the first target vehicle 2a when the lane change is completed, and the time it takes for the vehicle 1 to change the lane to the target lane.

$$TTC = \frac{X_{ref}}{-V_{Xrel} + a_E \cdot t}$$ [Equation 3]

That is, as the driving speed of the vehicle 1 increases or decreases when the vehicle 1 changes lanes, the acceleration of the vehicle 1 at the time of lane change is determined, and the relative distance $X_{rel}$ between the vehicle 1 and the first target vehicle 2a may be changed.

The controller 100 may determine whether or not to transmit a signal for restricting the lane change of the vehicle 1 based on the calculated time to collision.

That is, it is possible to determine whether or not to transmit a signal for restricting the lane change of the vehicle 1 according to whether the time to collision calculated according to Equation 3 is less than or equal to a value stored in advance in the memory 90.

When the estimated time to collision between the vehicle 1 and the first target vehicle 2a is equal to or less than a predetermined value when the lane change of the vehicle 1 is completed to the target lane, the controller 100 may send out a signal restricting the lane change of the vehicle 1.

That is, referring to FIG. 5, the lane change may be completed in the first zone Z1 close to the rear of the first target vehicle 2a when the vehicle 1 makes a lane change while increasing the driving speed, and the relative distance $X_{rel}$ between the vehicle 1 and the first target vehicle 2a is further shortened when the lane change is completed in the first zone Z1 and consequently the time to collision between the vehicle 1 and the first target vehicle 2a is shortened.

When the time to collision is shorter than the predetermined value, the controller 100 may send a signal for restricting the lane change of the vehicle 1 since the risk of collision is high after the vehicle 1 changes the lane, and the steering apparatus 60 may restrict the steering for changing the lane of the vehicle 1 to prevent the lane change of the vehicle 1.

At this time, the predetermined reference value to be compared with the calculated time to collision may be divided according to the setting.

That is, when the calculated time to collision is equal to or less than a predetermined first reference value, the controller 100 may determine that the vehicle 1 will collide with the first target vehicle 2a after completing the lane change to the target lane. In this case, the controller 100 may send out a signal for restricting the lane change of the vehicle 1. As described above, when the vehicle changes its lane while increasing the driving speed, the lane change may be completed in the first zone Z1 close to the rear of the first target vehicle 2a. At this time, since the time to collision calculated by the controller 100 is equal to or less than the predetermined first reference value, the controller 100 sends a signal for restricting the lane change of the vehicle 1, and the lane change of the vehicle 1 by the steering apparatus 60 may be prevented.

In addition, when the calculated time to collision exceeds the predetermined first reference value and is equal to or less than a predetermined second reference value, the controller 100 may determine that the risk of collision with the first target vehicle 2a is high after the vehicle 1 completes the lane change to the target lane. In this case, the controller 100 may also transmit a signal for restricting the lane change of the vehicle 1.

As described above, when the vehicle 1 changes lanes while maintaining the current driving speed, the lane change may be completed in the second zone Z2 which is located further rearward than the first zone Z1 with respect to the rear of the first target vehicle 2a, and at this time, since the time to collision calculated by the controller 100 exceeds the predetermined first reference value and is equal to or less than the predetermined second reference value, the controller 100 may determine that there is a risk of collision between the vehicle 1 and the first target vehicle 2a. Therefore, in this case also, the controller 100 sends out a signal for restricting the lane change of the vehicle 1, and the lane change of the vehicle 1 by the steering apparatus 60 may be prevented.

On the other hand, when the calculated time to collision exceeds the predetermined second reference value, the controller 100 may determine that there is no risk of collision with the first target vehicle 2a even if the vehicle 1 completes the lane change to the target lane. In this case, the controller 100 does not transmit a signal for restricting the lane change of the vehicle 1.

As described above, when the vehicle 1 makes a lane change while reducing the driving speed, the lane change may be completed in the third zone Z3 which is further rearward than the second zone Z2 with respect to the rear of the first target vehicle 2a, the controller 100 may determine that there is no risk of collision between the vehicle 1 and the first target vehicle 2a because the time to collision calculated by the controller 100 exceeds the predetermined second reference value. Therefore, in this case, the controller 100 does not send out a signal for restricting the lane change of the vehicle 1, and the lane change of the vehicle 1 is not prevented by the steering apparatus 60.

In this case, the first reference value may be a value smaller than the second reference value, for example, the first reference value may be 0 (zero) second and the second reference value may be 1.5 seconds.

Further, in a state in which the vehicle 1 makes a lane change to the rear of the first target vehicle 2a in the target lane, when the driving speed of the vehicle 1 is decreased and the acceleration of the vehicle 1 is less than a predetermined value, the controller 100 does not transmit a signal for restricting the lane change of the vehicle 1.

That is, when the driving speed of the vehicle 1 decreases when the lane of the vehicle 1 changes, the acceleration of the vehicle 1 becomes a negative value, and in this case, since the lane change of the vehicle 1 is completed in the third zone Z3 and the risk of collision with the first target vehicle 2a is low, the controller 100 does not output a signal for changing the lane of the vehicle 1.

Referring to FIG. 6, the sensor 200 may detect the target vehicle 2 driving in the right lane of the lane in which the vehicle 1 is driving. Likewise, the target vehicle 2 driving in the left lane of the lane in which the vehicle 1 is driving may also be detected.

Specifically, when there is a second target vehicle 2b driving in the target lane from the right rear side of the vehicle 1, the third rear side sensor 201c of the vehicle 1 may detect the second target vehicle 2b and obtain the coordinate information and the driving speed information of the second target vehicle 2b.

As shown in FIG. 6, when the vehicle 1 makes a lane change toward the front of the second target vehicle 2b driving in the target lane into which the lane is to be changed, the time to collision between the vehicle 1 and the second target vehicle 2b is changed based on the relative speed based on the driving speed of the vehicle 1 making the lane change and the driving speed of the second target vehicle 2b or the relative distance between the vehicle 1 and the second target vehicle 2b.

The position of the vehicle 1 at the target lane may be changed as the driving speed of the vehicle 1 increases or decreases when the vehicle 1 makes a lane change to the front of the second target vehicle 2b.

That is, when the vehicle 1 makes a lane change while reducing the traveling speed, the lane change may be completed in a sixth zone Z6 close to the front of the second target vehicle 2b. In addition, when the vehicle 1 changes lanes while maintaining the current driving speed, the lane change may be completed in a fifth zone Z5 located further forward than the sixth zone Z6 with respect to the front of the second target vehicle 2b. When the vehicle 1 makes a lane change while increasing the running speed, the lane change may be completed in a fourth zone Z4 which is located further forward than the fifth zone Z5 with respect to the second target vehicle 2b.

The positions of the fourth zone Z4 to the sixth zone Z6 of the target lane for the lane change of the vehicle 1 are determined based on the driving speed at the time of lane change of the vehicle 1 and the distance between the vehicle 1 and the second target vehicle 2b.

When the vehicle 1 makes a lane change, the risk of collision with the second target vehicle 2b may vary depending on whether the lane change is completed in the fourth zone Z4, the fifth zone Z5, or the sixth zone Z6 in front of the second target vehicle 2b that is driving in the target lane.

The acceleration of the vehicle 1 at the lane change has a negative value when the vehicle 1 decreases the driving speed of the vehicle 1 while changing the lane. In this case, since the vehicle 1 makes a lane change to a position close to the front of the second target vehicle 2b, the risk of collision between the vehicle 1 and the second target vehicle 2b after the lane change is increased.

On the other hand, when the vehicle 1 increases the driving speed of the vehicle 1 while changing the lane, the acceleration of the vehicle 1 at the lane change has a positive value. In this case, the risk of collision between the vehicle 1 and the second target vehicle 2b after the lane change is reduced because the vehicle 1 makes a lane change to a position relatively away from the front of the second target vehicle 2b.

The controller 100 may determine the acceleration of the vehicle 1 based on the amount of change in the driving speed sensed at the time of lane change of the vehicle 1, and the time to collision between the vehicle 1 and the second target vehicle 2b may be calculated when the lane change of the vehicle 1 to the target lane is completed based on the determined acceleration of the vehicle 1.

In a manner as described in FIG. 5, the controller 100 may calculate the time it takes for the vehicle 1 to change the lane to the target lane according to Equation (1) based on the current driving speed of the vehicle 1 and the lateral distance between the driving lane in which the vehicle 1 is currently driving and the target lane.

In addition, the controller 100 may determine the acceleration of the vehicle 1 based on the amount of change in the driving speed sensed when the lane of the vehicle 1 changes.

The controller 100 may calculate the relative distance $X_{rel}$ between the vehicle 1 and the second target vehicle 2b according to Equation 2 based on the determined acceleration $a_E$ of the vehicle 1 and the longitudinal relative speed $V_{Xrel}$ of the vehicle 1 and the second target vehicle 2b when the lane change is completed. At this time, based on the acceleration of the vehicle 1 determined at the time of lane change of the vehicle 1, the controller 100 may determine the longitudinal relative speed $V_{Xrel}$ between the vehicle 1 and the second target vehicle 2b upon completion of the lane change.

That is, as the driving speed of the vehicle 1 increases or decreases when the vehicle 1 changes lanes, the acceleration of the vehicle 1 at the time of lane changing is determined, and the relative distance $X_{rel}$ between the vehicle 1 and the second target vehicle 2b may be estimated when the lane change of the vehicle 1 is completed based thereon.

The controller 100 may calculate the time to collision between the vehicle 1 and the second target vehicle 2b in accordance with Equation (3) when the lane change of the vehicle 1 is completed to the target lane, based on the acceleration $a_E$ of the vehicle 1 determined when the vehicle 1 changes the lane, the relative distance $X_{rel}$ between the vehicle 1 and the second target vehicle 2b when the lane change is completed, the longitudinal relative speed $V_{Xrel}$ between the vehicle 1 and the second target vehicle 2b when the lane change is completed, and the time (t) it takes for the vehicle 1 to change the lane to the target lane.

That is, as the driving speed of the vehicle 1 increases or decreases when the vehicle 1 changes lanes, the acceleration of the vehicle 1 at the time of lane change is determined, and the relative distance $X_{rel}$ between the vehicle 1 and the second target vehicle 2b in the target lane may be changed.

The controller 100 may determine whether or not to transmit a signal for restricting the lane change of the vehicle 1 based on the calculated time to collision.

That is, it is possible to determine whether to transmit a signal for restricting the lane change of the vehicle 1 according to whether the estimated time to collision calculated according to Equation 3 is less than or equal to a value stored in advance in the memory 90.

When the estimated time to collision between the vehicle 1 and the second target vehicle 2b is less than a predetermined value when the lane change of the vehicle 1 is completed to the target lane, the controller 100 may send out a signal restricting the lane change of the vehicle 1.

That is, referring to FIG. 6, when the vehicle 1 makes a lane change while decreasing the driving speed, the lane change may be completed in the sixth zone Z6 close to the front of the second target vehicle 2b. When the lane change is completed in the sixth zone Z6, the relative distance $X_{rel}$ between the vehicle 1 and the second target vehicle 2b becomes shorter, and consequently, the time to collision between the vehicle 1 and the second target vehicle 2b becomes shorter.

When the time to collision is shorter than the predetermined value, the risk of collision is high after the vehicle 1 changes the lane, the controller 100 may transmit a signal restricting the lane change of the vehicle 1, and the steering apparatus 60 may prevent the lane change of the vehicle 1 by restricting the steering, which is intended to change the lane of the vehicle 1, according to the transmitted signal.

At this time, the predetermined reference value to be compared with the calculated time to collision may be divided according to the setting.

That is, when the calculated time to collision is equal to or less than the predetermined first reference value, the controller 100 may determine that the vehicle 1 will collide with the second target vehicle 2b after completing the lane change to the target lane. In this case, the controller 100 may send out a signal for restricting the lane change of the vehicle 1. As described above, when the vehicle makes a lane change while decreasing the driving speed, the lane change may be completed in the sixth zone Z6 close to the front of the second target vehicle 2b, and at this time, since the time to collision calculated by the controller 100 is equal to or less than the predetermined first reference value, the controller 100 sends a signal for restricting the lane change of the vehicle 1, and the lane change of the vehicle 1 by the steering apparatus 60 may be prevented.

When the calculated time to collision exceeds the predetermined first reference value and is equal to or less than the predetermined second reference value, the controller 100 may determine that the risk of collision with the second target vehicle 2b is high after the vehicle 1 completes the lane change to the target lane. In this case, the controller 100 may also transmit a signal restricting the lane change of the vehicle 1.

As described above, in the case where the vehicle 1 changes lanes while maintaining the current driving speed, the lane change may be completed in the fifth zone Z5 located further forward than the sixth zone Z6 in front of the second target vehicle 2b, and the controller 100 may determine that the vehicle 1 and the second target vehicle 2b are in danger of collision with each other because the time to collision calculated by the controller 100 exceeds the predetermined first reference value and is equal to or less than the predetermined second reference value. Therefore, in this case also, the controller 100 sends out a signal for restricting the lane change of the vehicle 1, and the lane change of the vehicle 1 by the steering apparatus 60 may be prevented.

On the other hand, when the calculated time to collision exceeds the predetermined second reference value, the controller 100 may determine that there is no risk of collision with the second target vehicle 2b even if the vehicle 1 completes the lane change to the target lane. In this case, the controller 100 does not transmit a signal for restricting the lane change of the vehicle 1.

As described above, when the vehicle 1 makes a lane change while increasing the driving speed, the lane change may be completed in the fourth zone Z4, which is located further forward than the fifth zone Z5 in front of the second target vehicle 2b, and at this time, since the time to collision calculated by the controller 100 exceeds the predetermined second reference value, the controller 100 may determine that there is no risk of collision between the vehicle 1 and the second target vehicle 2b. Therefore, in this case, the controller 100 does not send out a signal for restricting the lane change of the vehicle 1, and the lane change of the vehicle 1 is not prevented by the steering apparatus 60.

In this case, the first reference value may be a value smaller than the second reference value, for example, the first reference value may be 0 (zero) second and the second reference value may be 1.5 seconds.

In addition, when the vehicle 1 makes a lane change to the front of the second target vehicle 2b in the target lane, the controller 100 does not transmit a signal restricting the lane change of the vehicle 1 when the driving speed of the vehicle 1 increases and the acceleration of the vehicle 1 exceeds a predetermined value.

That is, when the driving speed of the vehicle 1 increases when the lane of the vehicle 1 changes, the acceleration of the vehicle 1 becomes a positive value, and in this case, the lane change of the vehicle 1 is completed in the fourth zone Z4. Therefore, since the risk of collision with the second target vehicle 2b is low, the controller 100 does not transmit a signal to change the lane of the vehicle 1.

FIG. 7 shows a case in which both the first target vehicle 2a and the second target vehicle 2b are driving in the target lane into which the vehicle is to change a lane.

That is, referring to FIG. 7, the lane change may be completed in a seventh zone Z7 close to the rear of the first target vehicle 2a when the vehicle 1 makes a lane change while increasing the driving speed When the lane change is completed in the seventh zone Z7, the relative distance $X_{rel}$ between the vehicle 1 and the first target vehicle 2a becomes shorter, and consequently, the time to collision between the vehicle 1 and the first target vehicle 2a is shortened.

When the time to collision is shorter than the predetermined value, the controller 100 may transmit a signal for restricting the lane change of the vehicle 1 since the risk of collision is high after the vehicle 1 changes the lane, and the steering apparatus 60 may prevent the lane change of the vehicle 1 by restricting the steering, which is to change the lane of the vehicle 1.

At this time, the predetermined reference value to be compared with the calculated time to collision may be divided according to the setting.

That is, when the calculated time to collision is equal to or less than the predetermined first reference value, the controller 100 may determine that the vehicle 1 will collide with the first target vehicle 2a after completing the lane change to the target lane. In this case, the controller 100 may send out a signal for restricting the lane change of the vehicle 1. As described above, when the vehicle changes its lane while increasing the driving speed, the lane change may be completed in the seventh zone Z7 close to the rear of the first target vehicle 2a, and at this time, since the time to collision calculated by the controller 100 is equal to or smaller than the predetermined first reference value, the controller 100 transmits a signal for restricting the lane change of the vehicle 1, and the lane change of the vehicle 1 by the steering apparatus 60 may be prevented.

When the calculated time to collision exceeds the predetermined first reference value and is equal to or less than the predetermined second reference value, the controller 100 may determine that the risk of collision with the first target vehicle 2a or the second target vehicle 2b is high after the vehicle 1 completes the lane change to the target lane. In this case, the controller 100 may also transmit a signal for restricting the lane change of the vehicle 1.

As described above, when the vehicle 1 changes lanes while maintaining the current driving speed, the lane change may be completed in a eighth zone Z8 located further behind the seventh zone Z7 in the rear of the first target vehicle 2a, and the eighth zone Z8 is also a zone located in front of the second target vehicle 2b.

At this time, since the time to collision calculated by the controller 100 exceeds the predetermined first reference value and is equal to or less than the predetermined second reference value, the controller 100 may determine that there is a risk of collision between the vehicle 1, and the first target vehicle 2a and the second target vehicle 2b. Therefore, in this case also, the controller 100 sends out a signal for restricting the lane change of the vehicle 1, and the lane change of the vehicle 1 by the steering apparatus 60 may be prevented.

When the calculated time to collision is equal to or less than the predetermined first reference value, the controller 100 may determine that the vehicle 1 will collide with the second target vehicle 2b after completing the lane change to the target lane. In this case, the controller 100 may send out a signal for restricting the lane change of the vehicle 1.

As described above, when the vehicle makes a lane change while decreasing the driving speed, the lane change may be completed in a ninth zone Z9 close to the front of the second target vehicle 2b, and at this time, since the time to collision calculated by the controller 100 is equal to or smaller than the predetermined first reference value, the controller 100 transmits a signal for restricting the lane change of the vehicle 1, and the lane change of the vehicle 1 by the steering device 60 may be prevented.

That is, as shown in FIG. 7, when the first target vehicle 2a and the second target vehicle 2b are all driving in the target lane when the vehicle 1 makes a lane change to the target lane, there is a risk of collision with both the first target vehicle 2a and the second target vehicle 2b in all cases where the vehicle 1 changes the lane while decreasing the driving speed, the vehicle 1 changes the lane while increasing the driving speed, and the vehicle 1 changes the lane while maintaining the driving speed. Therefore, the controller 100 sends out a signal for restricting the lane change of the vehicle 1 and the lane change of the vehicle 1 may be prevented by the steering apparatus 60.

Figure 8:
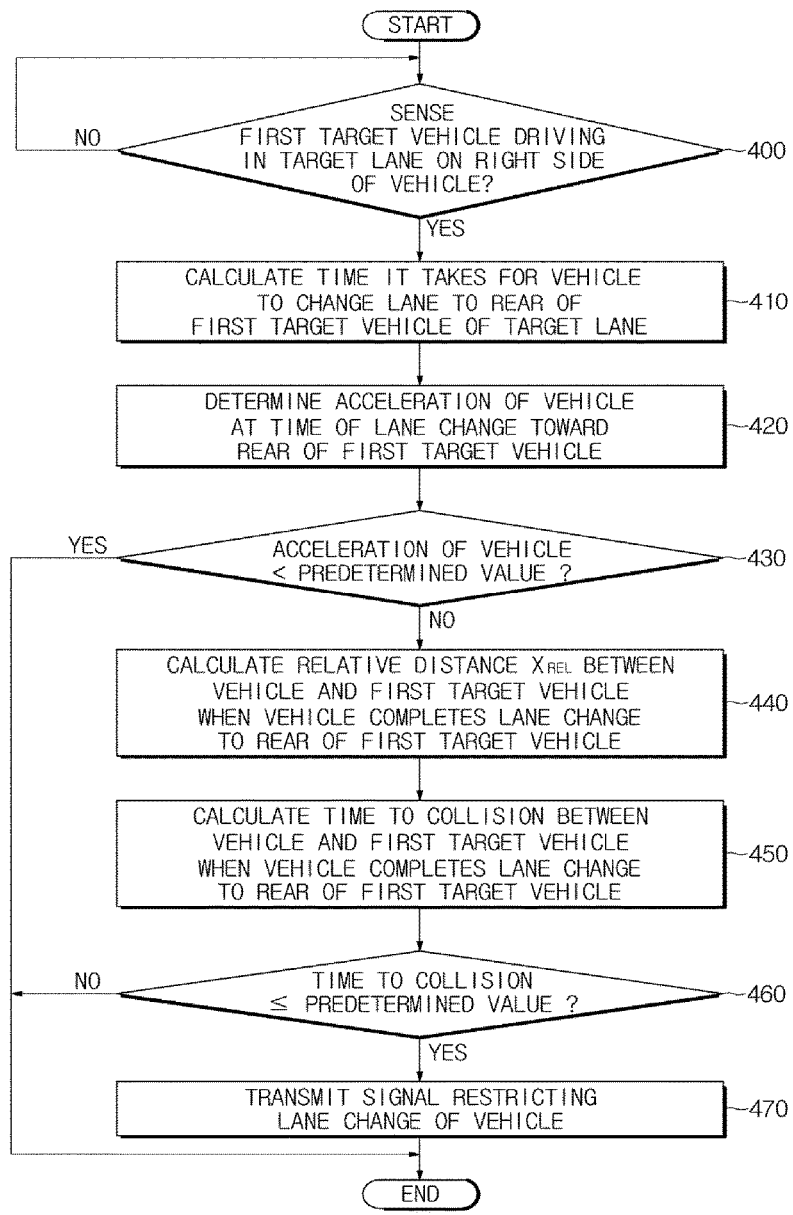
FIGS. 8 and 9 are flowcharts showing a vehicle control method according exemplary implementations of the present disclosure.
Figure 9:
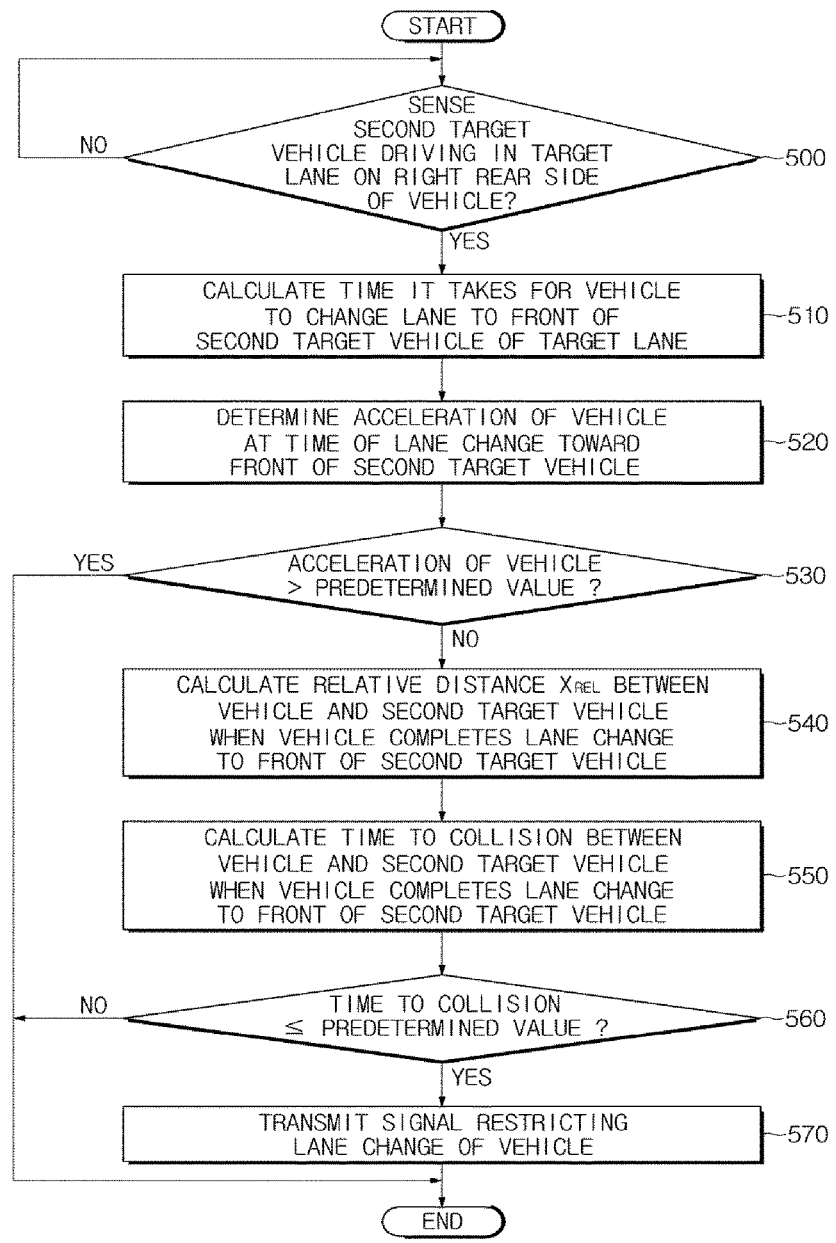

FIGS. 8 and 9 are flowcharts showing a vehicle control method according to exemplary implementations of the present disclosure.

Referring to FIG. 8, the controller 100 may determine whether the sensor 200 senses the first target vehicle 2a driving in the target lane on the right front side of the vehicle 1 (400), and the third sensor 200c of the vehicle 1 may sense the first target vehicle 2a and obtain the coordinate information and the driving speed information of the first target vehicle 2a.

The controller 100 may calculate the time it takes for the vehicle 1 to change the lane to the rear of the first target vehicle 2a of the target lane based on the current driving speed of the vehicle 1 and the lateral distance between the driving lane in which the vehicle 1 is currently driving and the target lane (410).

The controller 100 may determine the acceleration of the vehicle 1 based on the amount of change in the driving speed of the vehicle 1 sensed at the time of lane change toward the rear of the first target vehicle 2a (420), and determine whether the determined acceleration of the vehicle 1 is less than a predetermined value (430).

As a result of the determination, when the acceleration of the vehicle 1 that changes lanes is less than a predetermined value, the risk that the vehicle 1 will collide with the first target vehicle 2a at the time of lane change to the rear of the first target vehicle 2a is low, so the controller 100 may not transmit a signal restricting the lane change of the vehicle 1.

On the other hand, when the acceleration of the vehicle 1 making the lane changing is greater than or equal to the predetermined value, there is a high risk that the vehicle 1 will collide with the first target vehicle 2a when the lane change is to the rear of the first target vehicle 2a, so the controller 100 may calculate the relative distance $X_{rel}$ between the vehicle 1 and the first target vehicle 2a when the vehicle 1 completes the lane change to the rear of the first target vehicle 2a (440).

The controller 100 may calculate the time to collision between the vehicle 1 and the first target vehicle 2a when the lane change of the vehicle 1 to the target lane is completed, based on the acceleration $a_E$ of the vehicle 1 determined when the vehicle 1 changes the lane, the relative distance $X_{rel}$ between the vehicle 1 and the first target vehicle 2a when the lane change is completed, the longitudinal relative speed $V_{Xrel}$ between the vehicle 1 and the first target vehicle 2a when the lane change is completed, and the time (t) it takes for the vehicle 1 to change the lane to the target lane (450).

The controller 100 may compare the calculated time to collision with a predetermined value (460), and when the calculated time to collision is equal to or less than the predetermined value, the controller 100 may transmit a signal restricting the lane change of the vehicle 1 (470). The control method of the vehicle 1 of FIG. 8 has been described above with reference to FIG. 6, and a duplicate description will be omitted.

Referring to FIG. 9, the controller 100 may determine whether the sensor 200 senses the second target vehicle 2b driving in the target lane from the right rear side of the vehicle 1 (500), and the third rear side sensor 201c or the fourth rear side sensor 201d of the vehicle 1 may sense the second target vehicle 2b and obtain the coordinate information and the driving speed information of the second target vehicle 2b.

The controller 100 may calculate the time it takes for the vehicle 1 to change the lane to the front of the second target vehicle 2b in the target lane based on the current driving speed of the vehicle 1 and the lateral distance between the driving lane in which the vehicle 1 is currently driving and the target lane (510).

The controller 100 may determine the acceleration of the vehicle 1 based on the driving speed change amount detected when the vehicle 1 makes a lane change to the front of the second target vehicle 2b, and may determine whether the acceleration of the determined vehicle 1 exceeds a predetermined value (530).

As a result of the determination, when the acceleration of the vehicle 1 making the lane change exceeds the predetermined value, the risk that the vehicle 1 will collide with the second target vehicle 2b when the lane change is made forward of the second target vehicle 2b is low, and the controller 100 may not transmit a signal for restricting the lane change of the vehicle 1.

On the other hand, when the acceleration of the lane changing vehicle 1 is equal to or less than the predetermined value, there is a high risk that the vehicle 1 will collide with the second target vehicle 2b when the lane change is made forward of the second target vehicle 2b, and thus the controller 100 may calculate the relative distance $X_{rel}$ between the vehicle 1 and the second target vehicle 2b when the vehicle 1 completes the lane change to the front of the second target vehicle 2b (540).

The controller 100 may calculate the time to collision between the vehicle 1 and the second target vehicle 2b when the lane change of the vehicle 1 is completed to the target lane based on the acceleration $a_E$ of the vehicle 1 determined when the vehicle 1 changes the lane, the relative distance $X_{rel}$ between the vehicle 1 and the second target vehicle 2b when the lane change is completed, the longitudinal relative speed $V_{Xrel}$ between the vehicle 1 and the second target vehicle 2b when the lane change is completed, and the time (t) it takes for the vehicle 1 to change the lane to the target lane (550).

The controller 100 may compare the calculated time to collision with a predetermined value (560), and may transmit a signal to restrict the lane change of the vehicle 1 when the calculated time to collision is equal to or less than a predetermined value (570). The control method of the vehicle 1 of FIG. 9 has been described above with reference to FIG. 7, and a duplicate description will be omitted.

The disclosed implementations may be implemented in the form of a recording medium that stores instructions executable by a computer. The instructions may be stored in the form of program code and may perform the operations of the implementations disclosed by creating a program module when executed by a processor. The recording medium may be implemented in a computer-readable recording medium.

The computer readable recording medium may include various kinds of recording medium in which an instruction decrypted by the computer system is stored. For example, the computer readable recording medium may include a Read Only Memory (ROM), a Random Access Memory (RAM), a magnetic tape, a magnetic disk, a flash memory, and an optical data storage device.

When the driver changes the lane of the vehicle, the change of the lane is restricted only when the collision with another vehicle is predicted after changing the lane in consideration of the driving speed of the vehicle due to acceleration or deceleration of the driving speed of the vehicle. Therefore, it is effective to prevent the unnecessary lane change from being restricted and realize a stable lane departure prevention system.

The implementations disclosed with reference to the accompanying drawings have been described above. It will be understood by those skilled in the art that the present disclosure may be practiced in other forms than the disclosed implementations without departing from the spirit or essential characteristics of the present disclosure. The disclosed implementations are illustrative and should not be construed as limiting.

What is claimed is:

1. A vehicle, comprising:
    a speed detector for detecting a driving speed of the vehicle;
    a sensor for detecting a target vehicle driving in a target lane into which the vehicle is to change from a driving lane of the vehicle; and
    a controller for determining an acceleration of the vehicle based on a change amount of the driving speed detected at the time of the vehicle entering the target lane, for calculating a time to collision (TTC) between the vehicle and the target vehicle based on the acceleration of the vehicle when the vehicle enters the target lane, and for transmitting a signal for restricting a lane change of the vehicle based on the TTC,
    wherein the sensor detects a first target vehicle driving in the target lane in front of the vehicle, and detects a second target vehicle driving in the target lane behind the vehicle,
    wherein the controller does not transmit the signal for restricting the lane change if the acceleration of the vehicle is less than a reference value when the vehicle enters the target lane behind the first target vehicle, and
    wherein the controller does not transmit the signal for restricting the lane change if the acceleration of the vehicle exceeds the reference value when the vehicle enters the target lane in front of the second target vehicle.

2. The vehicle of claim 1, wherein the controller transmits the signal for restricting the lane change when the TTC is equal to or less than a reference TTC, and does not transmit the signal for restricting the lane change when the TTC exceeds the reference TTC.

3. The vehicle of claim 1, wherein the controller calculates the TTC between the vehicle and the first target vehicle in the target lane when the vehicle enters the target lane behind the first target vehicle.

4. The vehicle of claim 3, wherein the controller transmits the signal for restricting the lane change when the TTC between the vehicle and the first target vehicle is equal to or less than the reference TTC, and does not transmit the signal for restricting the lane change when the TTC between the vehicle and the first target vehicle exceeds the reference TTC.

5. The vehicle of claim 1, wherein the controller calculates the TTC between the vehicle and the second target vehicle in the target lane when the vehicle enters the target lane in front of the second target vehicle.

6. The vehicle of claim 5, wherein the controller transmits the signal for restricting the lane change when the TTC between the vehicle and the second target vehicle is equal to or less than a reference TTC, and does not transmit the signal for restricting the lane change when the TTC between the vehicle and the second target vehicle exceeds the reference TTC.

7. The vehicle of claim 1, wherein the controller calculates a period of time taken for the vehicle to enter the target lane based on the driving speed of the vehicle and a lateral distance between the driving lane of the vehicle and the target lane.

8. The vehicle of claim 7, wherein the controller calculates a relative distance between the vehicle and the target vehicle based on a relative speed of the vehicle and the target vehicle and the acceleration of the vehicle when the vehicle completely enters the target lane.

9. The vehicle of claim 8, wherein the controller calculates the TTC between the vehicle and the target vehicle based on the period of time taken for the vehicle to enter the target lane and the relative distance when the vehicle completely enters the target lane.

10. The vehicle of claim 1, wherein the sensor comprises one or more of a Radio Detection and Ranging (RADAR) and a Light Detection And Ranging (LiDAR) device.

11. A method for controlling a vehicle, comprising steps of:
    detecting, by a sensor, a first target vehicle driving in a target lane, into which the vehicle is to enter from a driving lane of the vehicle, in front of the vehicle and a second target vehicle driving in the target lane behind the vehicle;
    determining, by a controller, an acceleration of the vehicle based on a change amount of a driving speed detected at the time of the vehicle entering the target lane;
    calculating, by the controller, a time to collision (TTC) between the vehicle and the target vehicle based on the acceleration of the vehicle when the vehicle completely enters the target lane;
    transmitting, by the controller, a signal for restricting a lane change of the vehicle based on the TTC;
    not transmitting the signal for restricting the lane change if the acceleration of the vehicle is less than a reference value when the vehicle enters the target lane behind the first target vehicle; and
    not transmitting the signal for restricting the lane change if the acceleration of the vehicle exceeds the reference value when the vehicle enters the target lane in front of the second target vehicle.

12. The method of claim 11, wherein the step of calculating the TTC comprises steps of:
    calculating the TTC between the vehicle and the first target vehicle when the vehicle enters the target lane behind the first target vehicle; and calculating the TTC between the vehicle and the second target vehicle when the vehicle enters the target lane in front of the second target vehicle.

13. The method of claim 12, wherein the step of transmitting the signal for restricting the lane change comprises steps of:
    transmitting the signal for restricting the lane change when the TTC between the vehicle and the first target vehicle is equal to or less than a reference TTC; and
    not transmitting the signal for restricting the lane change when the TTC between the vehicle and the first target vehicle exceeds the reference TTC.

14. The method of claim 12, wherein the step of transmitting the signal restricting the lane change comprises steps of:
    transmitting the signal for restricting the lane change when the TTC between the vehicle and the second target vehicle is equal to or less than a reference TTC; and
    not transmitting the signal for restricting, the lane change when the TTC between the vehicle and the second target vehicle exceeds the reference TTC.

15. The method of claim 11, further comprising steps of:
    calculating a period of time taken for the vehicle to enter the target lane based on the driving speed of the vehicle and a lateral distance between the driving lane of the vehicle and the target lane;
    calculating a relative distance between the vehicle and the target vehicle based on a relative speed of the vehicle and the target vehicle and the acceleration of the vehicle when the vehicle completely enters the target lane; and
    calculating the TTC between the vehicle and the target vehicle based on the period of time taken for the vehicle to enter the target lane and the calculated relative distance when the vehicle completely enters the target lane.

* * * * *